(12) United States Patent
Schuster

(10) Patent No.: US 9,982,826 B1
(45) Date of Patent: May 29, 2018

(54) UNIVERSAL PLUG

(71) Applicant: Danco, Inc., Irving, TX (US)

(72) Inventor: Michael J. Schuster, Shorewood, IL (US)

(73) Assignee: Danco, Inc., Irving, TX (US)

( * ) Notice: Subject to any disclaimer, the term of this patent is extended or adjusted under 35 U.S.C. 154(b) by 189 days.

(21) Appl. No.: 15/009,625

(22) Filed: Jan. 28, 2016

Related U.S. Application Data

(60) Provisional application No. 62/108,980, filed on Jan. 28, 2015.

(51) Int. Cl.
*F16L 55/10* (2006.01)
*F16L 55/11* (2006.01)

(52) U.S. Cl.
CPC .................................. *F16L 55/1108* (2013.01)

(58) Field of Classification Search
CPC ..... B63B 13/00; F16L 55/1141; F16L 55/132; E04H 4/12
USPC ..... 138/89, 90; 220/235, 236, 238; 215/273, 215/315
See application file for complete search history.

(56) References Cited

U.S. PATENT DOCUMENTS

| | | | |
|---|---|---|---|
| 1,808,411 A | | 6/1931 | Hinkston |
| 2,155,491 A | * | 4/1939 | Jacobs ..................... F28F 11/02 138/89 |
| 2,685,379 A | | 8/1954 | Moeller |
| 2,773,619 A | * | 12/1956 | Moeller ................... E03F 5/042 220/237 |
| 2,855,003 A | * | 10/1958 | Thaxton ................ F16L 55/136 138/90 |
| 2,870,794 A | | 1/1959 | Thaxton |
| 2,978,138 A | * | 4/1961 | Moeller ................... B63B 13/00 114/197 |
| 3,349,944 A | * | 10/1967 | Moeller ................... G01F 23/04 184/109 |
| 3,494,504 A | | 2/1970 | Jackson |
| 3,618,809 A | | 11/1971 | Martino |
| 3,674,055 A | * | 7/1972 | Ray ....................... F16L 55/132 126/116 B |
| 3,812,810 A | * | 5/1974 | Moeller ................... B63B 13/00 114/197 |

(Continued)

OTHER PUBLICATIONS

Sioux Chief Manufacturing Company, Inc. Catalog, Edition 31, 4/15, 12 pages.

*Primary Examiner* — Patrick F Brinson
(74) *Attorney, Agent, or Firm* — Thomas|Horstemeyer, LLP

(57) ABSTRACT

Disclosed are various embodiments for a universal plug having an outer wall and an inner wall that surrounds an inner cavity along an axis of symmetry of the universal plug, the universal plug comprising a first plug tier having a first outer surface diameter that extends a first length along the axis of symmetry and a second plug tier having a second outer surface diameter that extends a second length along the axis of symmetry from the first plug tier; a compression shank situated in and extending through the inner cavity of the universal plug; a compression head attached to a distal end of the compression shank and having a larger diameter than the compression shank; a washer comprising an opening, the compression shank extending through the opening; and a threaded gasket cap comprising a threaded opening.

25 Claims, 17 Drawing Sheets

(56) References Cited

U.S. PATENT DOCUMENTS

| | | | |
|---|---|---|---|
| 3,859,945 A * | 1/1975 | Moeller | B63B 13/02 |
| | | | 114/197 |
| 4,088,149 A | 5/1978 | Logsdon | |
| 4,381,800 A * | 5/1983 | Leslie | F16L 55/136 |
| | | | 138/90 |
| 4,474,216 A | 10/1984 | Noe | |
| 4,493,344 A | 1/1985 | Mathison et al. | |
| 4,585,033 A | 4/1986 | Westman | |
| 4,683,597 A | 8/1987 | Taylor, Jr. et al. | |
| 4,760,868 A | 8/1988 | Saxon | |
| 4,762,151 A | 8/1988 | Kinnan | |
| 4,768,560 A | 9/1988 | Logsdon | |
| 5,035,266 A | 7/1991 | Benson | |
| 5,044,403 A | 9/1991 | Chen | |
| 5,287,892 A * | 2/1994 | Sanderson | F16L 55/11 |
| | | | 138/149 |
| 5,307,841 A * | 5/1994 | Condon | F16L 55/132 |
| | | | 138/89 |
| 5,348,085 A | 9/1994 | Benson | |
| 5,353,841 A | 10/1994 | Mathison et al. | |
| 6,170,530 B1 * | 1/2001 | Steblina | F16L 55/132 |
| | | | 138/89 |
| 6,250,337 B1 | 6/2001 | Bevacco | |
| 6,513,549 B2 | 2/2003 | Chen | |
| 6,883,546 B1 * | 4/2005 | Kobylinski | F16L 55/1141 |
| | | | 138/89 |
| 7,171,987 B2 | 2/2007 | Serret | |
| 7,464,727 B1 | 12/2008 | Larson et al. | |
| 7,546,847 B2 | 6/2009 | Morrison et al. | |
| 8,037,904 B2 * | 10/2011 | Carnevali | F16L 55/132 |
| | | | 138/89 |
| 2007/0006928 A1 * | 1/2007 | Meserlian | E04H 4/12 |
| | | | 138/89 |

* cited by examiner

UNIVERSAL PLUG

CROSS REFERENCE TO RELATED APPLICATIONS

This application claims the benefit of, and priority to, U.S. Provisional Patent Application No. 62/108,980, entitled "Universal Plug," and filed on Jan. 28, 2015, the entire contents of which is hereby incorporated herein by reference.

BACKGROUND

Generally, a series of pipes are used to transport fluids from one location to another. For example, sewer pipes are used to carry sewage waste and gases outside of and away from commercial and residential buildings. A tee may be connected to multiple sewer pipes and provide access to a sewer system. Tees and sewer pipes may be manufactured with different size diameters. Often times, a plug is used to temporarily seal an access point in the sewer system.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Typically, a plug is called for to seal a pipe opening or for pressure testing a pipe system. In these scenarios, the diameter of the pipe needs to be determined. A plug of the appropriate size can then be selected based on the diameter of the pipe. In that context, the present disclosure relates to a universal-style plug that can seal openings in pipes of various diameters.

In addition to the diameter of the pipe, other factors that may be considered when selecting a plug may include whether the pipe opening has threads and the material the plug is comprised of. In some instances, when a male threaded metal plug is tightened in a female threaded metal portion of a clean out tee, the two metals can weld together. Under these conditions, the metal threaded plug may need to be cut off with a chisel or other means to access the sewer pipe. This type of removal often results in the metal plug being destroyed during the attempt to remove the threaded plug. In addition, a portion of the threads of the female threaded opening may be exposed to water, chemicals, and sewer gas that can cause rust to accumulate, which fills in the threads with debris and/or corrodes the threads. This makes it difficult to insert a new male threaded plug into the female opening.

Various embodiments of the present disclosure relate to a multi-tier compression gasket plug that can create a seal with pipe openings of different diameters. According to aspects of the multi-tier compression gasket plug described herein, when it is inserted into a pipe opening and situated at one of the multiple tiers of a compression gasket of the plug, an individual may turn a threaded gasket cap of the plug to secure it into place. The threaded gasket cap is in threaded engagement with a threaded wedge of the plug. As the threaded gasket cap is turned, a compression head attached to a distal end of the threaded wedge is pulled toward the threaded gasket cap. As the compression head is pulled toward the threaded gasket cap, the compression head is pulled or forced into a cavity within the compression gasket. At the same time, the compression head pushes against an inner wall of the compression gasket, which pushes the outer wall of the compression gasket against an inner surface of the pipe opening. In that way, the threaded gasket cap can be turned to an appropriate degree to create an effective seal between the inner surface of the pipe opening and the outer wall of the compression gasket.

Figure 1A:
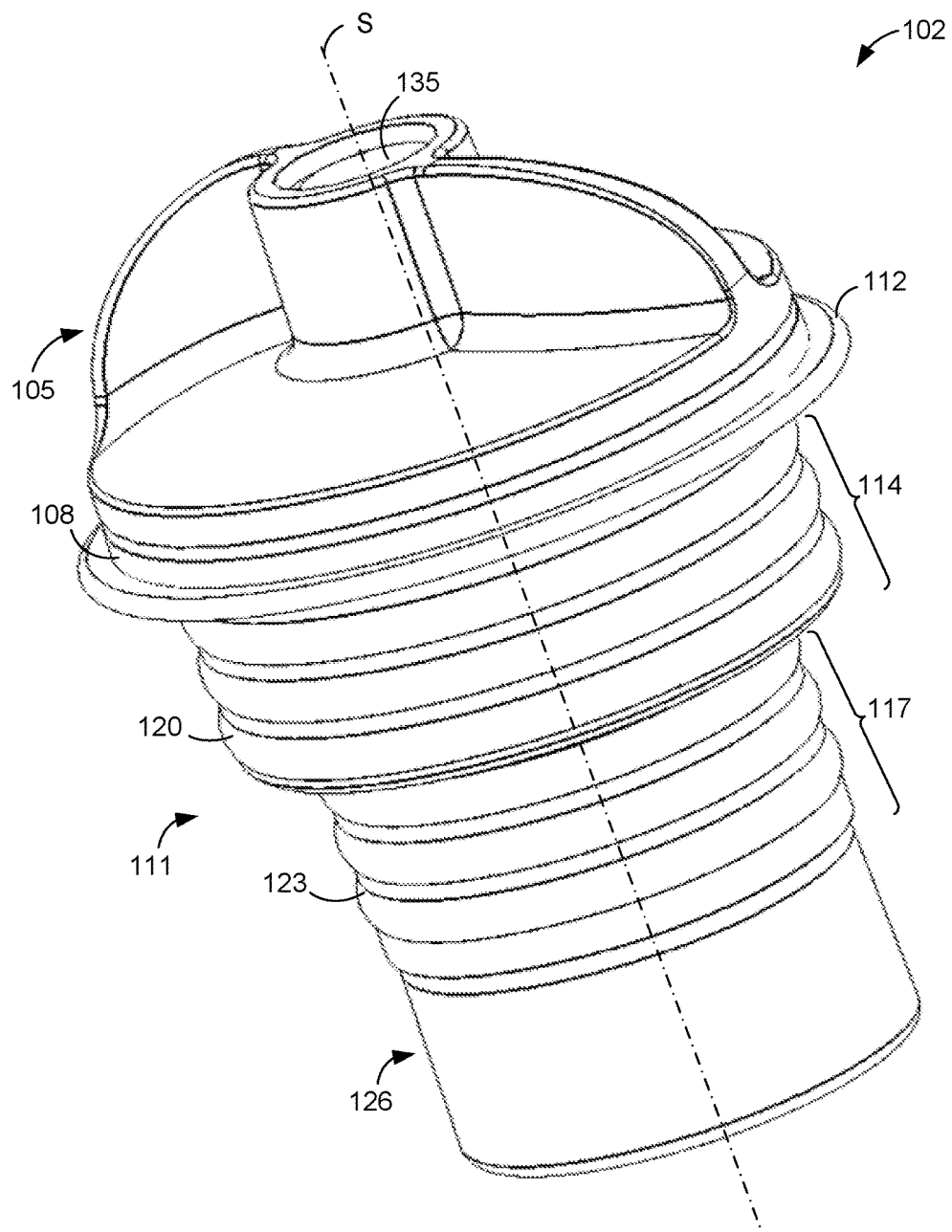
FIGS. 1A and 1B illustrate a perspective view and an exploded view of an example multi-tier compression gasket plug, respectively, according to one embodiment described herein.

Turning to the drawings, a general description of embodiments of a multi-tier compression gasket plug and its components is provided, followed by a discussion of the operation of the same. With reference to FIG. 1A, a perspective view of a multi-tier compression gasket plug 102 is shown. The multi-tier compression gasket plug 102 includes a threaded gasket cap 105 situated above a washer 108 along its axis of symmetry "S". As shown, the washer 108 is situated above a compression gasket 111. The compression gasket 111 includes a top plug lip 112, a first plug tier 114, and a second plug tier 117. In the embodiment shown in FIG. 1A, the first plug tier 114 and the second plug tier 117 each have a ribbed outer surface. The ribbed surface outer surface includes a first tier of outer seal beads 120 and a second tier of outer seal beads 123. In other embodiments described below, one or both of the seal beads 120 or 123 can be omitted or follow a different geometry. Although the compression gasket 111 is illustrated as having two tiers, the compression gasket 111 can include other numbers of tiers, such as three or four tiers, for example, while still being consistent with the structure and operation of the multi-tier compression gasket plug 102.

The compression gasket 111 is situated above a lower portion of a threaded wedge 126 along its axis of symmetry "S". Although not completely shown in FIG. 1A, the threaded wedge 126 includes a compression shank 135 that extends through an inner cavity of the compression gasket 111, through a central aperture or opening of the washer 108, and into threaded engagement with a threaded central aperture or opening of the threaded gasket cap 105. In some embodiments, the central aperture or opening of the washer 108 may also be formed as a threaded central aperture, and the compression shank 135 can extend in threaded engagement through both the washer 108 and the threaded gasket cap 105.

The multi-tier compression gasket plug 102 has several advantages over existing solutions. As indicated above, the multi-tier compression gasket plug 102 can be installed in and used to seal openings in various pipes of different diameters. In addition, the outer seal beads 120 and 123 can be used to seal a pipe with threads or with no threads. For example, when the compression gasket 111 is compressed against a pipe opening with female threads, the outer seal beads 120 and 123 can be used to create a seal with the female threads or in an application where seal beads are removed the rubber gasket embeds into the threads. Thus, the multi-tier compression gasket plug 102 can be used to prevent unintentionally welding plugs with other metal pipe connections with threads or without. Thus, the multi-tier compression gasket plug 102 can be installed and removed in a shorter amount of time than existing solutions.

Figure 1B:
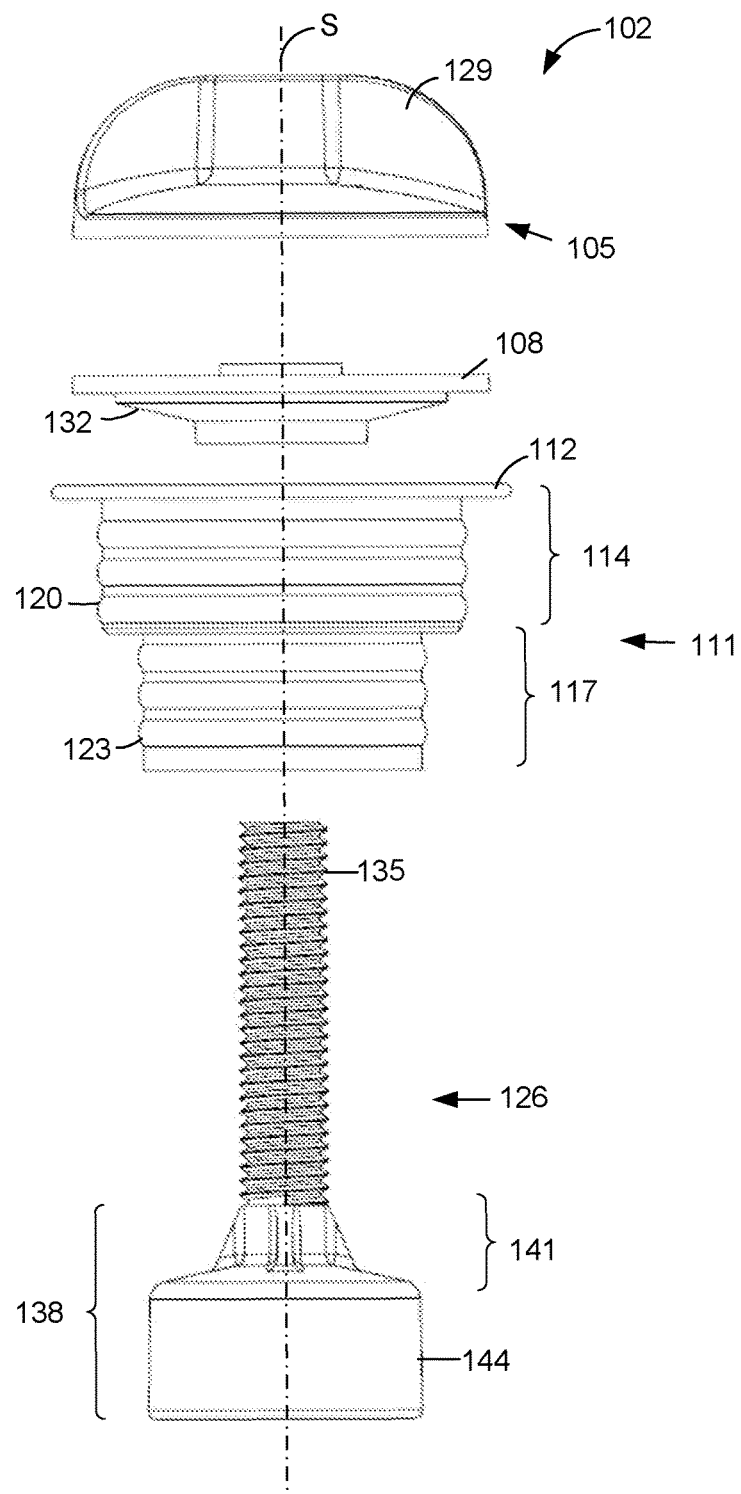

Referring next to FIG. 1B, shown is an exploded view of the parts of the multi-tier compression gasket plug 102 from FIG. 1A, including the threaded gasket cap 105, the washer 108, the compression gasket 111, and the threaded wedge 126 arranged along the axis of symmetry "S". In the illustrated embodiment, the threaded gasket cap 105 includes a grip 129 that assists the individual in turning the threaded gasket cap 105. Based on the shape of the grip 129, the threaded gasket cap 105 can be pivoted about the axis of symmetry "S" by hand, similar to the way that a wingnut is secured. In some embodiments, the grip 129 can be omitted and the threaded gasket cap 105 can be formed to include a hexagonal head or other geometry for example. A tool, such as a wrench, can then be used to turn the threaded gasket cap 105. In other embodiments, the threaded gasket cap 105 can include at least a portion of the grip 129 and a hexagonal head. The threaded gasket cap 105 can be formed from plastic, metal, or other suitable materials.

The threaded gasket cap 105 is positioned above the washer 108 along the axis of symmetry "S". In that configuration, the threaded gasket cap 105 and the washer 108 are in contact with each other. As the threaded gasket cap 105 is turned, the washer 108 keeps the threaded gasket cap 105 separate from the compression gasket 111 and prevents any friction between them. An extended step 132 is included on one side of the washer 108. When fully assembled, the extended step 132 of the washer 108 may be positioned to fit into a recess step of the compression gasket 111 (See FIG. 8A). In one embodiment, the extended step 132 of the washer 108 is shaped to substantially fill the entire recessed step of the compression gasket 111. In that way, the washer 108 can be centered with the compression gasket 111 along the axis of symmetry "S".

The compression gasket 111 includes a top plug lip 112 formed along an edge of the first plug tier 114. In the illustrated embodiment, the first plug tier 114 includes the first tier outer seal beads 120. The first tier outer seal beads 120 are shaped in a ribbed configuration along the outer surface of the first plug tier 114 of the compression gasket 111. The first tier of outer seal beads 120 is formed to create a seal against a pipe opening with threads or with pipe connections without threads. The first plug tier 114 can be formed to any desired or suitable diameter.

In addition, the compression gasket 111 includes a second plug tier 117 formed to a diameter less than the first plug tier 114. In the illustrated embodiment, the second plug tier 117 includes a second tier of outer seal beads 123 along the outer surface of the second plug tier 117. In other embodiments, the second tier of outer seal beads 123 can be configured in various patterns along the outer surface of the second plug tier 117 as compared to that shown. Among the embodiments, the compression gasket 111 can be formed from thermoplastic elastomers (TPE), thermoplastic rubber (TPR), thermoplastic vulcanizate (TPV), rubber, styrene-butadiene or styrene-butadiene (SBR) rubber, flexible polyvinyl chloride (PVC), ethylene propylene diene monomer (EPDM), nitrile butadiene rubber (NBR), silicone or other suitable materials.

As shown in FIG. 1B, the threaded wedge 126 includes a compression shank 135 and an upper portion 141 and a lower portion 144 of a compression head 138. In the illustrated embodiment, the compression shank 135 is attached to the upper portion 141 of the compression head 138 at a first distal end. The compression shank 135 includes threads formed on its outer surface that extend from the upper portion of the compression head 138 to a second distal end of the compression shank 135. The threaded wedge 126 can be formed from plastic, metal, or other suitable materials. When assembled, the compression shank 135 of the threaded wedge 126 extends through an inner cavity of the compression gasket 111. The compression gasket 111 includes a top opening and a bottom opening. The threaded wedge 126 can be inserted into the compression gasket 111 from the bottom opening and extend through the top opening. The threaded wedge 126 also extends through an opening in the washer 108 and through an opening in the threaded gasket cap 129. In some embodiments, the threaded wedge 126 can be straight or wedge shaped with the wedge tapering upward or downward. The threaded wedge 126 will have a smaller outside diameter (OD) than the inside diameter (ID) of the smallest pipe the multi-tiered compression gasket plug 102 is designed to work in. The threaded wedge 126 may include a flare or flared rim at the bottom that limits travel when the threaded wedge 126 is tightened into the smaller tier opening (See FIGS. 6C-6D). The flare prevents the threaded wedge 126 from traveling beyond the second plug tier 117 when the desire is to plug the smaller size opening because the compression gasket 111 cannot expand far enough into the smaller opening and limiting the travel (See FIG. 6D). The flare can travel beyond the second plug tier 117 provided the multi-tiered compression gasket plug 102 is positioned in a larger pipe opening because the rubber of the second plug tiered 117 of the compression gasket 111 will have room to expand (See FIG. 6E). The flared OD will be smaller than the ID opening of the smallest pipe the multi-tiered compression gasket 102 is designed for.

In the illustrated embodiment, the upper portion 141 of the compression head 138 is configured in a tapered shape. The upper portion 141 may be formed in other suitable shapes. Because of the shape of the upper portion 141, it can facilitate a portion of the compression head 138 moving from below the compression gasket 111 along the axis of symmetry "S" to a space inside of the inner cavity of the compression gasket 111 when the threaded gasket cap 105 is turned.

The multi-tier compression gasket plug 102 can be assembled by inserting the compression shank 135 of the threaded wedge 135 through the inner cavity of the compression gasket 111. The compression shank 135 can be inserted through an opening at the bottom of the compression gasket 111 and extended through the top opening. The compression shank 135 can be inserted through the central aperture of the washer 108 and the threaded central aperture of the threaded gasket cap 129. In some embodiments, when assembled, the compression shank 135 can be in threaded engagement with the threaded gasket cap 129 and the washer 108. The threaded engagement can facilitate the threaded gasket cap 105 turning about the compression shank 135.

As shown in FIGS. 2A, 2B, 3A, and 3B, an individual can insert the multi-tier compression gasket plug 102 into a pipe opening. The individual can determine whether to use the first plug tier 114 or the second plug tier 117 based on the diameter of the pipe opening. For example, the individual may determine that the pipe opening has a diameter of two inches. In this example, the first plug tier 114 may have a diameter of about two inches. The individual can insert the multi-tier compression gasket plug 102, including the first plug tier 114, into the pipe opening. The individual can then use the grips 129 to turn the threaded gasket cap 105 about the compression shank 135.

As the threaded gasket cap 105 is turned, the threaded engagement with the compression shank 135 can cause the threaded wedge 126 to be pulled toward the threaded gasket cap 105. In addition, as the threaded wedge 126 is pulled toward the threaded gasket cap 105, the compression head 138 moves to occupy a space in the inner cavity of the compression gasket 111. In turn, the compression head 138 compresses against the inner wall of the compression gasket 111, and the outer wall of the compression gasket 111 pushes against the inner surface of the pipe opening. This compression between the outer wall of the compression gasket 111 and the inner wall of the pipe opening results in a seal being formed at the first plug tier 117, which prevents the flow of fluids and gases from escaping the pipe opening. In some embodiments, the first tier of outer seal beads 120 on the outer surface of the compression gasket 111 can be used to create the seal against the inner wall of the pipe opening with female threads. In addition, as the first plug tier 114 is used to create a seal, the second plug tier 117 may not be engaged against the inner surface of the pipe opening.

Figure 2A:
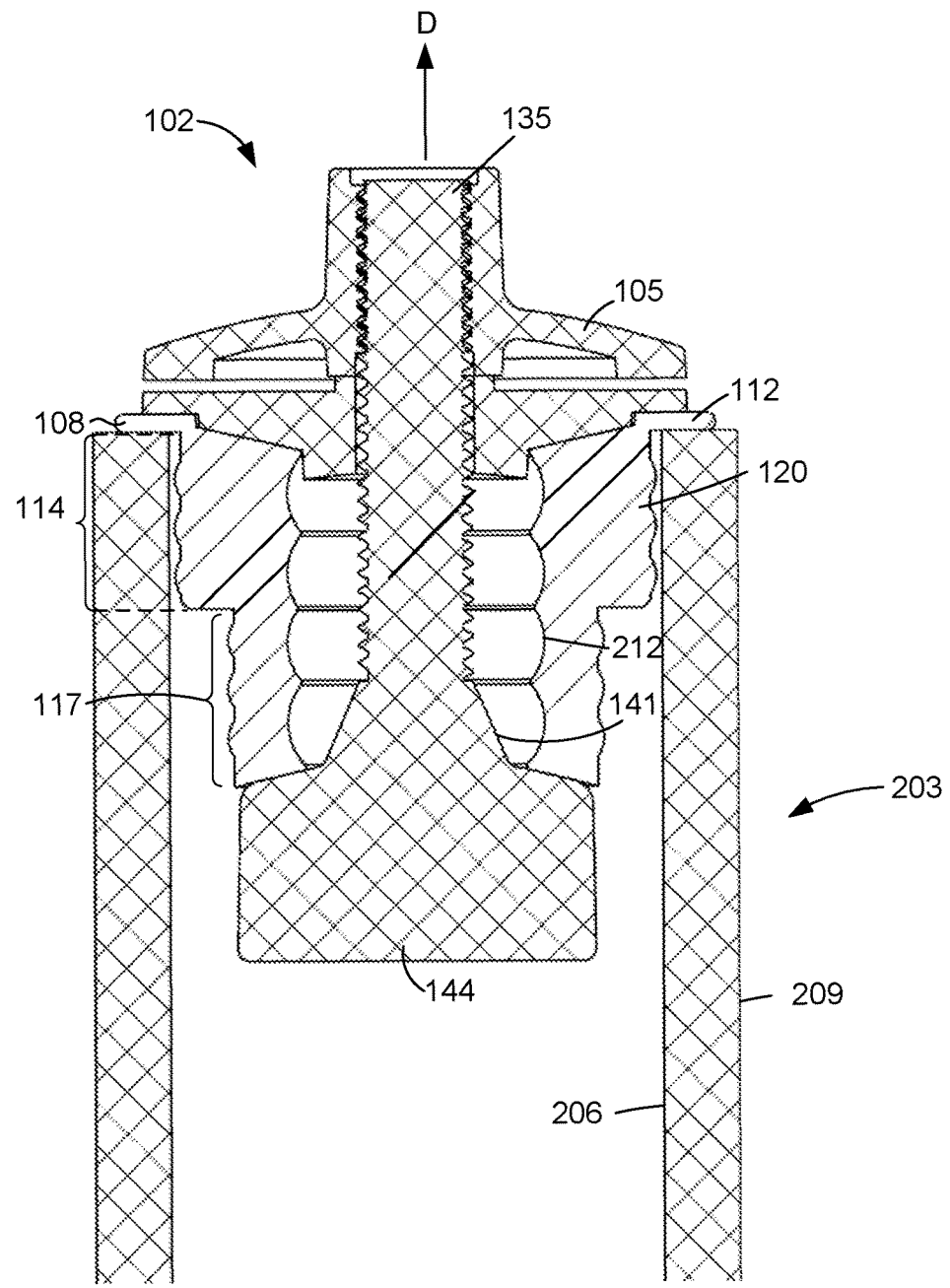
FIGS. 2A and 2B illustrate cross sectional views of the multi-tier compression gasket plug shown in FIGS. 1A and 1B employing a first plug tier of the compression gasket in a pipe according to one embodiment described herein.

Turning now to FIG. 2A, shown is a cross sectional view of the multi-tier compression gasket plug 102 shown in FIGS. 1A and 1B. The multi-tier compression gasket plug 102 is inserted into an opening at an end of a pipe 203. As shown, the pipe 203 is of sufficient diameter so that the first plug tier 114 of the compression gasket 111, which is larger in size than the second plug tier 117, fits within the opening at the end of the pipe 203. In FIG. 2A, the threaded gasket cap 105 of the multi-tier compression gasket plug 102 is not tightened.

As shown in FIG. 2A, the pipe 203 has an inner surface 206 and an outer wall 209. The inner surface 206 has no threads near the opening of the pipe 203. In the illustrated embodiment, the first tier of outer seal beads 120 of the first plug tier 114 are not presently being used to seal the pipe 203 because the threaded gasket cap 105 is not tightened. Further, as illustrated, the top plug lip 112 is seated against an outer annual ring of the opening of the pipe 203 and the second plug tier 117 is not engaged with the inner surface 206. Further, the compression gasket 111 comprises an inner wall 212 that surrounds an inner cavity of the compression gasket 111. In the illustrated embodiment, the inner wall 212 may comprise of one or more ribbed segments, although the ribbed segments can be omitted in other embodiments.

Over the range of threaded engagement between the compression shank 135 and the threaded gasket cap 105 shown in FIG. 2A, the compression head 138 occupies a space outside the inner cavity of the compression gasket 111. In other words, over the portion of the compression shank 135 that is in threaded engagement with the threaded gasket cap 105 in FIG. 2A, the compression head 138 is outside the inner cavity of the compression gasket 111. Here, the multi-tier compression gasket plug 102 has not yet been tightened or secured into position at least partially within the pipe 203. When the threaded gasket cap 105 is turned or pivoted clockwise by an individual, the compression shank 135 is pulled or raised up in the direction "D" due to the threaded engagement between the compression shank 135 and the threaded gasket cap 105. As the threaded gasket cap 105 is turned or pivoted clockwise, the range of engagement between the threaded gasket cap 105 and the compression shank 135 varies along the threaded gasket cap 105.

Figure 2B:
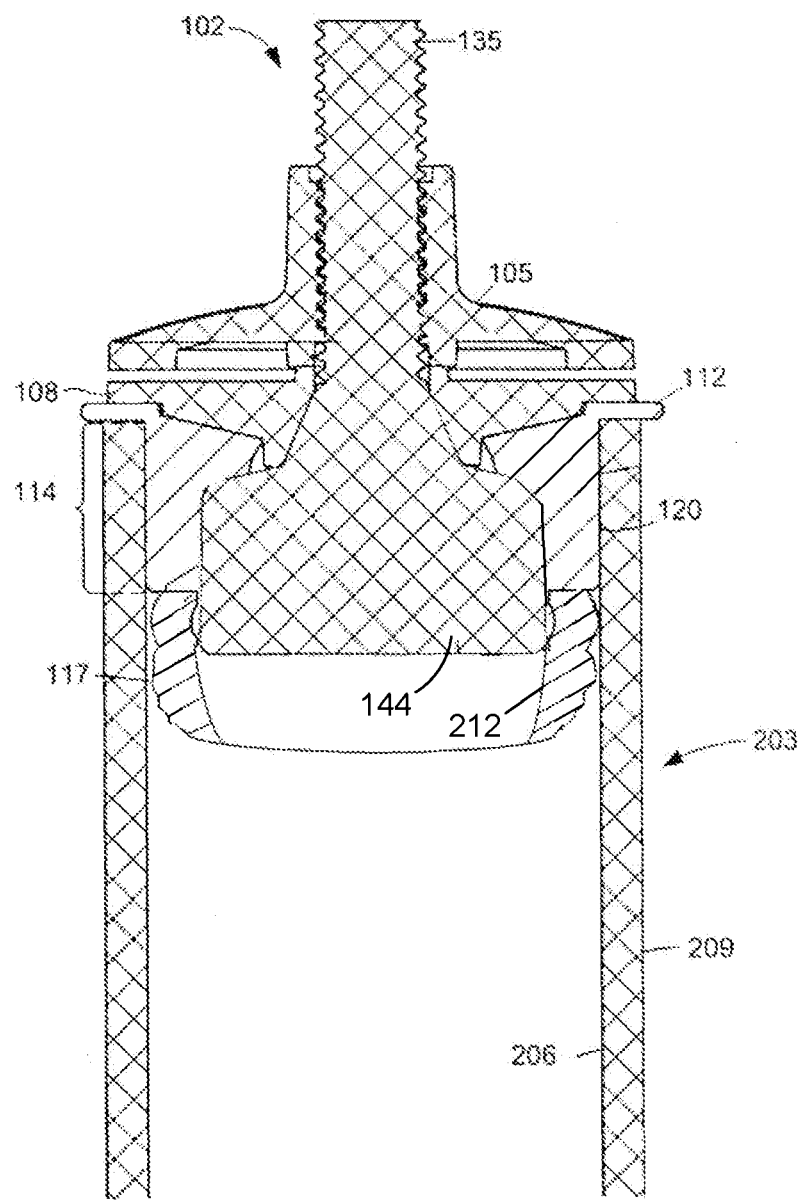

Moving on to FIG. 2B, shown is a cross sectional view of the multi-tier compression gasket plug 102 in FIGS. 1A and 1B employing the first plug tier 114 of the compression gasket 111 in the pipe 203 with the threaded gasket cap 105 tightened. FIG. 2B illustrates the multi-tier compression gasket plug 102 using the first plug tier 114 to create a seal with the inner surface 206 of the pipe 203. In particular, the first tier of outer seal beads 120 of the first plug tier 114 is used to seal the opening in the pipe 203.

The multi-tier compression gasket plug 102 can be used to seal an access point in a series of pipes or it can be used for pressure testing the pipes or preventing sewer gas or sewage from escaping the plumbing system. In operation, the multi-tier compression gasket plug 102 is inserted into a pipe opening at a particular depth from the top of the pipe opening. In the illustrated embodiment, one of the two tiers create a seal at the pipe opening based on the diameter size of the pipe opening. The first plug tier 114 can create a seal at the pipe opening based on the diameter size of the pipe opening being substantially similar to the diameter size of the first plug tier 114. The multi-tier compression gasket plug 102 can be inserted into the particular depth associated with the first plug tier 114. The threaded gasket cap 105 is rotated to an appropriate degree to suitably secure the multi-tier compression gasket plug 102 into a pipe opening. The compression shank 135 of the threaded wedge 126 pulls toward the threaded gasket wedge 126.

As the threaded wedge 126 is pulled, the lower portion 144 of the compression head 138 transitions from being below the compression gasket 111 to occupy a space within the inner cavity of the compression gasket 111. As such, the compression head 138 presses against the inner wall 212 of the compression gasket 111 in an outward direction. The inner wall 212 then presses against the outer wall of the compression gasket 111 in an outward direction away from the center. As the threaded gasket cap 105 is rotated, the range of the threaded engagement between the threaded gasket cap 105 and the compression shank 135 moves along the threaded gasket cap 105 and the compression head 138 raises to occupy at least a portion of the inner cavity 212 within the first plug tier 114. Thus, an outside diameter (OD) of the second plug tier 117 expands and the outer wall of the compression gasket 111 is then compressed against the inner wall 206 of the pipe opening. The threaded gasket cap 105 can be turned to such a degree that this compression presses the first tier of outer seal beads 120 against the inner surface 206, which creates a seal that prevents liquids and gases from escaping. In addition, the same multi-tier compression gasket plug 102 can use the second plug tier 117 to create a seal for a pipe with a diameter smaller than the pipe 203.

Figure 3A:
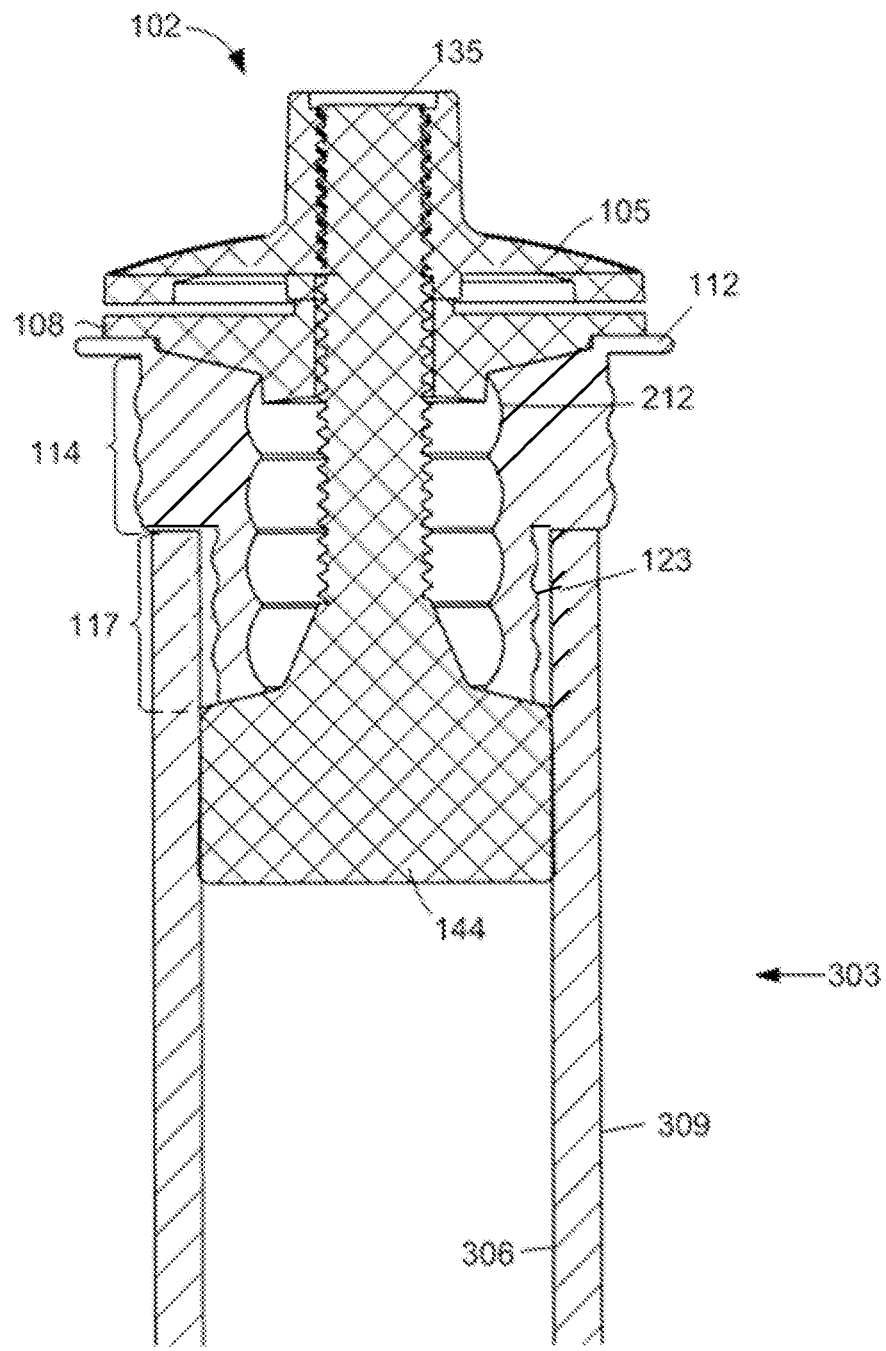
FIGS. 3A and 3B illustrate cross sectional views of the multi-tier compression gasket plug shown in FIGS. 1A and 1B employing a second tier of the compression gasket in a pipe according to one embodiment described herein.

Turning now to FIG. 3A, shown is a cross sectional view of the multi-tier compression gasket plug 102 shown in FIGS. 1A and 1B. The multi-tier compression gasket plug 102 is inserted into an opening at an end of a pipe 303. As shown, the pipe 303 is of sufficient diameter so that the second plug tier 117 of the compression gasket 111, which is smaller in size than the first plug tier 114, fits within the opening at the end of the pipe 303. In FIG. 3A, the threaded gasket cap 105 of the multi-tier compression gasket plug 102 is not tightened.

As shown in FIG. 3A, the pipe 303 has an inner surface 306 and an outer wall 309. The inner surface 306 has no threads near the opening of the pipe 303. The second tier of outer seal beads 123 of the second plug tier 117 are not being used to seal the pipe 303 because the threaded gasket cap 105 is not tightened. As illustrated in the embodiment, a portion of the bottom of the first plug tier 114 is seated against an outer ring of the opening of the pipe 303. In addition, FIG. 3A illustrates the first plug tier 114 not being used to create seal against the inner surface 306 of the pipe 303.

Figure 3B:
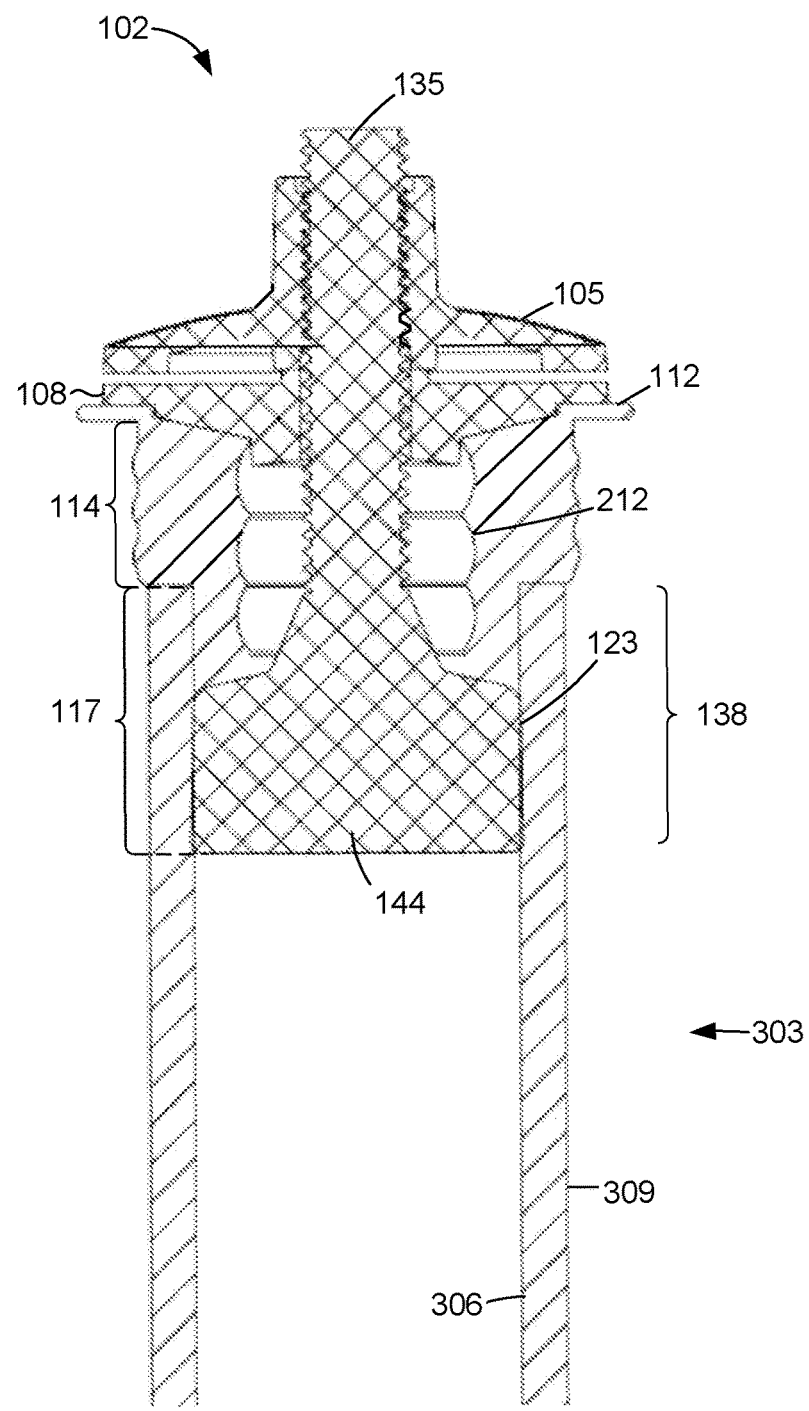

Turning now to FIG. 3B, shown is a cross sectional view of the multi-tier compression gasket plug 102 shown in FIGS. 1A and 1B. FIG. 3B illustrates the multi-tier compression gasket plug 102 using the second plug tier 117 of the compression gasket 111 in the pipe 303 with the threaded gasket cap 105 tightened.

Similar to the previous figures, as the threaded gasket cap 105 is turned, the threaded engagement between the threaded gasket cap 105 and the compression shank 135 of the threaded wedge 126 causes the compression head 138 to be pulled into the inner cavity of the compression gasket 111.

As shown in FIG. 3B, the threaded gasket cap 105 has been turned to such a degree that the lower portion 144 of the compression head 138 has transitioned from being below the compression gasket 111 to occupy a space at least partially within the inner cavity of the compression gasket 111. The compression shank 135 travels toward and through the threaded gasket cap 105. The range of a threaded engagement between the threaded gasket cap 105 and the compression shank 135, the compression head 135 occupies at least a portion of the inner cavity of the compression gasket 111. As the lower portion 144 of the compression head 138 moves into a space within the inner cavity of the compression gasket 111, the threaded wedge 126 forces the compression gasket 111 to expand in diameter by pressing against the inner wall 212. The inner wall 212 then pushes the outer surface of the second plug tier 117 to compress against the inner surface 306 of the pipe 303. This compression presses the second tier of outer seal beads 123 against the inner surface 306, which creates a seal that prevents liquids and gases from escaping. In some embodiments, the second plug tier 117 can create a seal against the inner surface 306 without the second tier of outer seal beads 123.

Figure 4A:
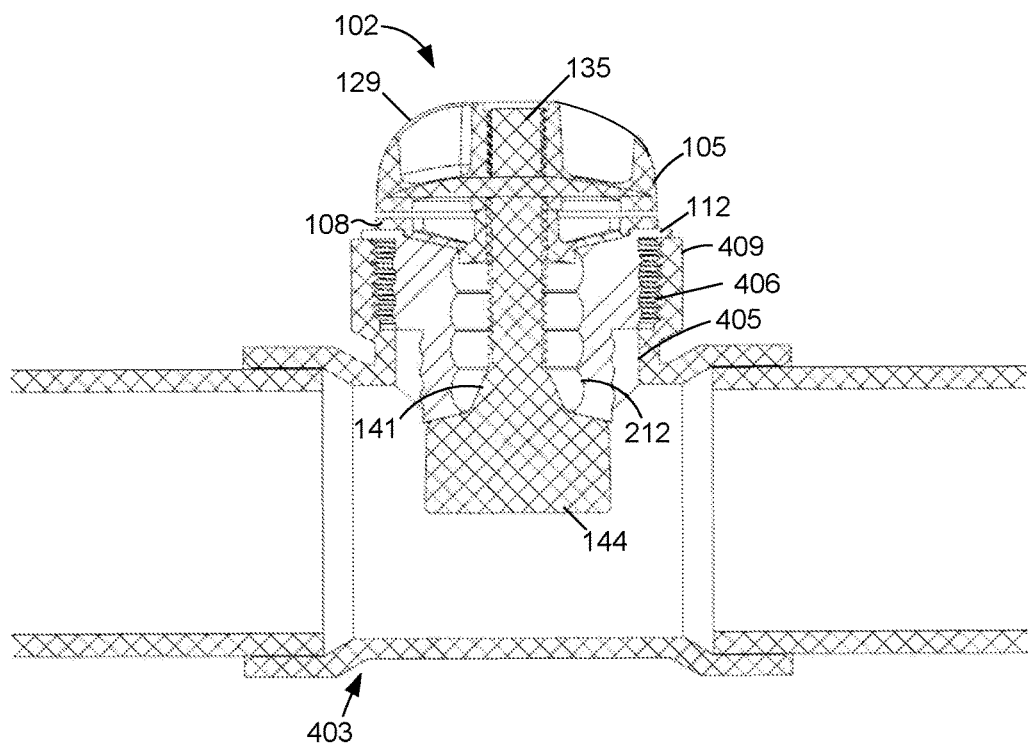
FIGS. 4A and 4B illustrate cross sectional views of the multi-tier compression gasket plug shown in FIGS. 1A and 1B employing the second tier of the compression gasket in a tee according to one embodiment described herein.

Referring next to FIG. 4A, shown is a cross sectional view of the multi-tier compression gasket plug 102 shown in FIGS. 1A and 1B. FIG. 4A illustrates the multi-tier compression gasket plug 102 inserted into an opening of a tee 403. As shown, the tee 403 is of sufficient diameter so that the first plug tier 114 of the compression gasket 111 fits within the opening of the tee 403. In addition, the threaded gasket cap 105 is shown in an untightened state.

As shown in FIG. 4A, the tee 403 has an inner surface 405 with inner threads 406 near the top and an outer wall 409. The first tier of outer seal beads 120 of the first plug tier 114 are not being used to create a seal with the tee 403 because the threaded gasket cap 105 is not tightened. Further, the top plug lip 112 is situated on an outer ring at the opening of the tee 403 and the second plug tier 117 is not engaged with the inner surface 405 of the tee 403.

In addition, the compression gasket 111 comprises an inner wall 212 that surrounds an inner cavity. In the illustrated embodiment, the inner wall 212 comprises multiple ribbed segments. Also, the upper portion 141 of the compression head 138 can be situated in a lower portion of the inner cavity of the compression gasket 111. The lower portion 144 of the compression head 138 is positioned below the compression gasket 111.

Figure 4B:
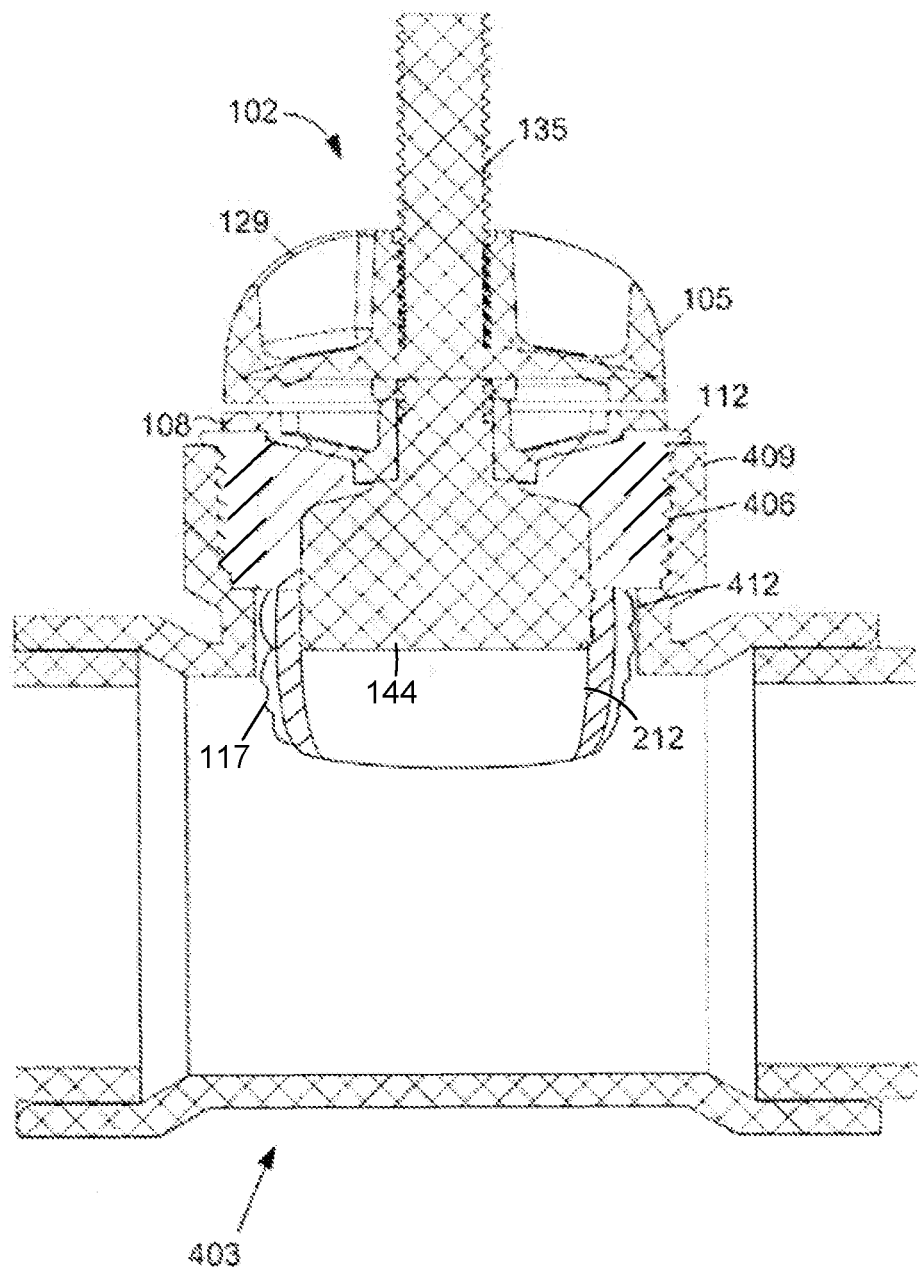

Moving on to FIG. 4B, shown is a cross sectional view of the multi-tier compression gasket plug 102 shown in FIGS. 1A and 1B. FIG. 3B illustrates the multi-tier compression gasket plug 102 using the first plug tier 114 of the compression gasket 111 in the opening of the tee 403 with the threaded gasket cap 105 tightened.

As discussed above, as the threaded gasket cap 105 is turned, the threaded engagement causes the threaded wedge 126 to be pulled toward and through the threaded gasket cap 105. In the illustrated embodiment, the threaded gasket cap 105 has been turned to such a degree that the lower portion 144 of the compression head 138 has transitioned from being below the compression gasket 111 to occupy a space in the inner cavity of the compression gasket 111. The threaded shank 135 travels toward and through the threaded gasket cap 105. As threaded wedge 126 travels toward the threaded gasket cap 105, the threaded wedge 126 forces the compression gasket 111 to expand in diameter by pressing against the inner wall 212. The inner wall 212 then forces the outer surface of the first plug tier 114 to compress against the inner threads 406 of the tee 403. This compression crushes the outer seal beads 120 against the inner threads 406, which creates a seal that prevents liquids and gases from escaping. In addition, the seal prevents the inner threads 406 from being exposed to liquids and gases, which prevents rust and/or corrosion from occurring.

Figure 5:
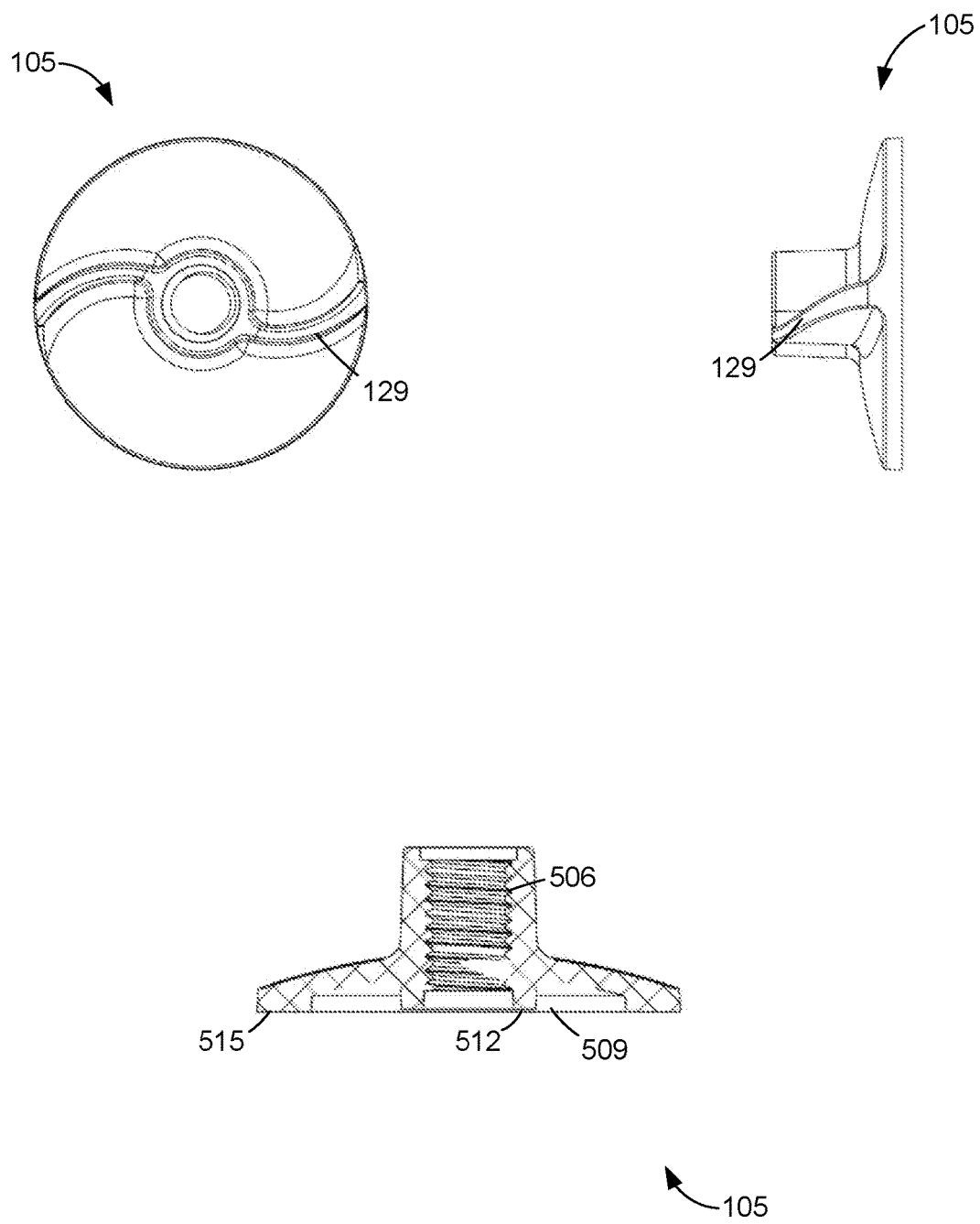
FIG. 5 illustrates a top view, a side view, and a cross sectional view of a threaded gasket cap according to one embodiment described herein.

With reference to FIG. 5, shown is a top view, a side view, and a cross sectional view of the threaded gasket cap 105. In the illustrated embodiment, the threaded gasket cap 105 includes multiple grips 129 that enable the threaded gasket cap 105 to be tightened by hand or with a tool. Also, in the illustrated embodiment, the grips 129 are shown as being in a wing shape. Specifically, the grips 129 are displayed as curved-shaped in a parallel plane to a threaded opening 506 in the threaded gasket cap 105. As one non-limiting example, the threaded gasket cap 105 can be in the form of a wingnut. The threaded gasket cap 105 may also include a lower portion 509 that comes into contact with the washer 108. The lower portion 509 can include protruding surfaces 512 and 515. In other embodiments, the lower portion 509 may be flat without the protruding surfaces 512 and 515.

Figure 6A:
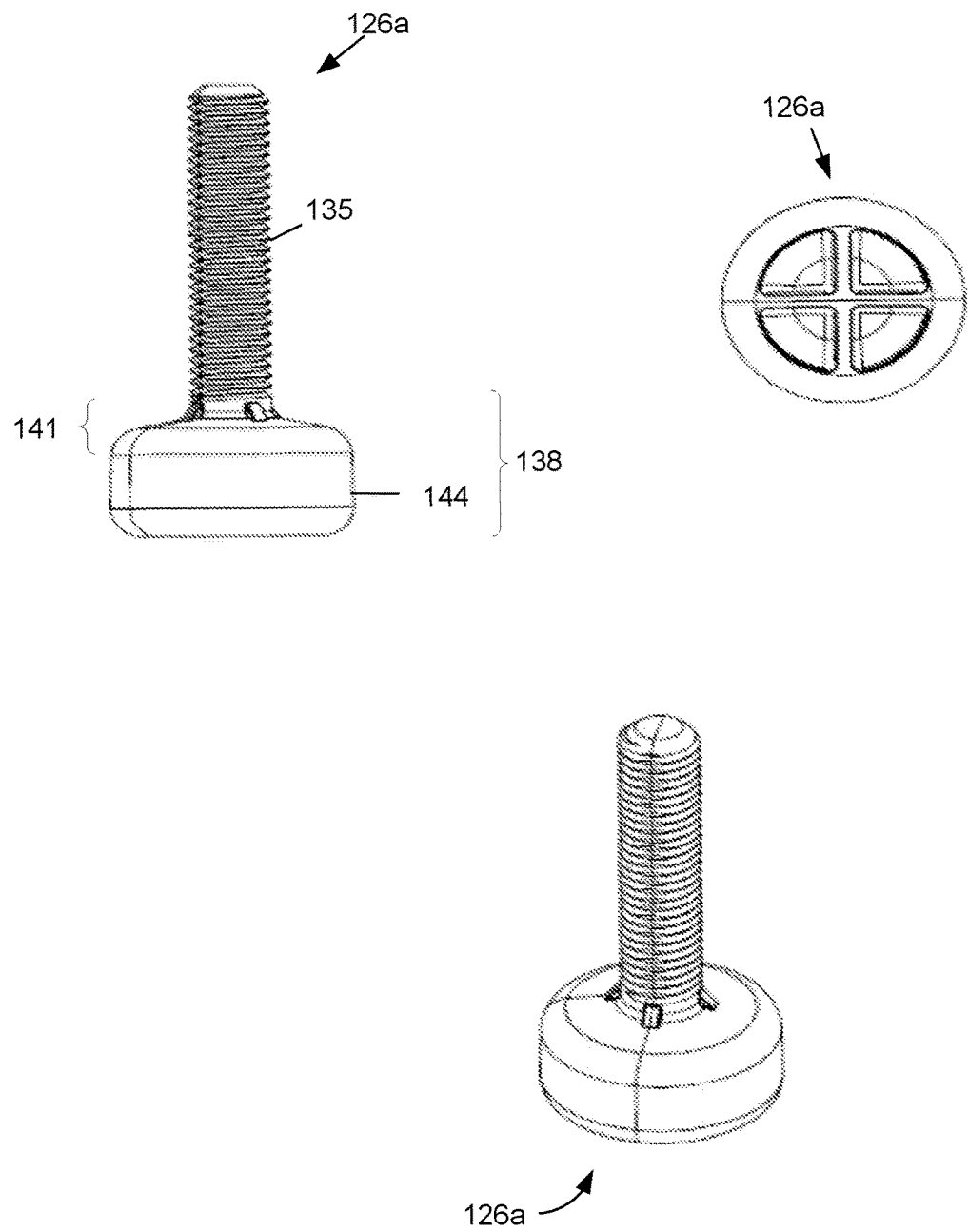
FIG. 6A illustrates a side view, a perspective view, and a bottom view of a first example threaded wedge according to one embodiment described herein.

With reference to FIG. 6A, shown is a side view, a perspective view, and a bottom view of a first example threaded wedge. A threaded wedge 126a may include a compression shank 135 attached to a compression head 138 at a distal end. The compression head 138 may also include an upper portion 141 and a lower portion 144. The compression shank 135 can have a series of threads. The threads can be used to facilitate a threaded engagement between the threaded wedge 126a and the threaded gasket cap 105. In addition, the upper portion 141 of the compression head 138 may be configured in various shapes. For example, the upper portion 141 can be configured with a rounded surface, a tapered surface, a multi-step surface, and other suitable configurations. As one non-limiting example, FIG. 6A illustrates the upper portion 141 comprising a rounded surface.

Figure 6B:
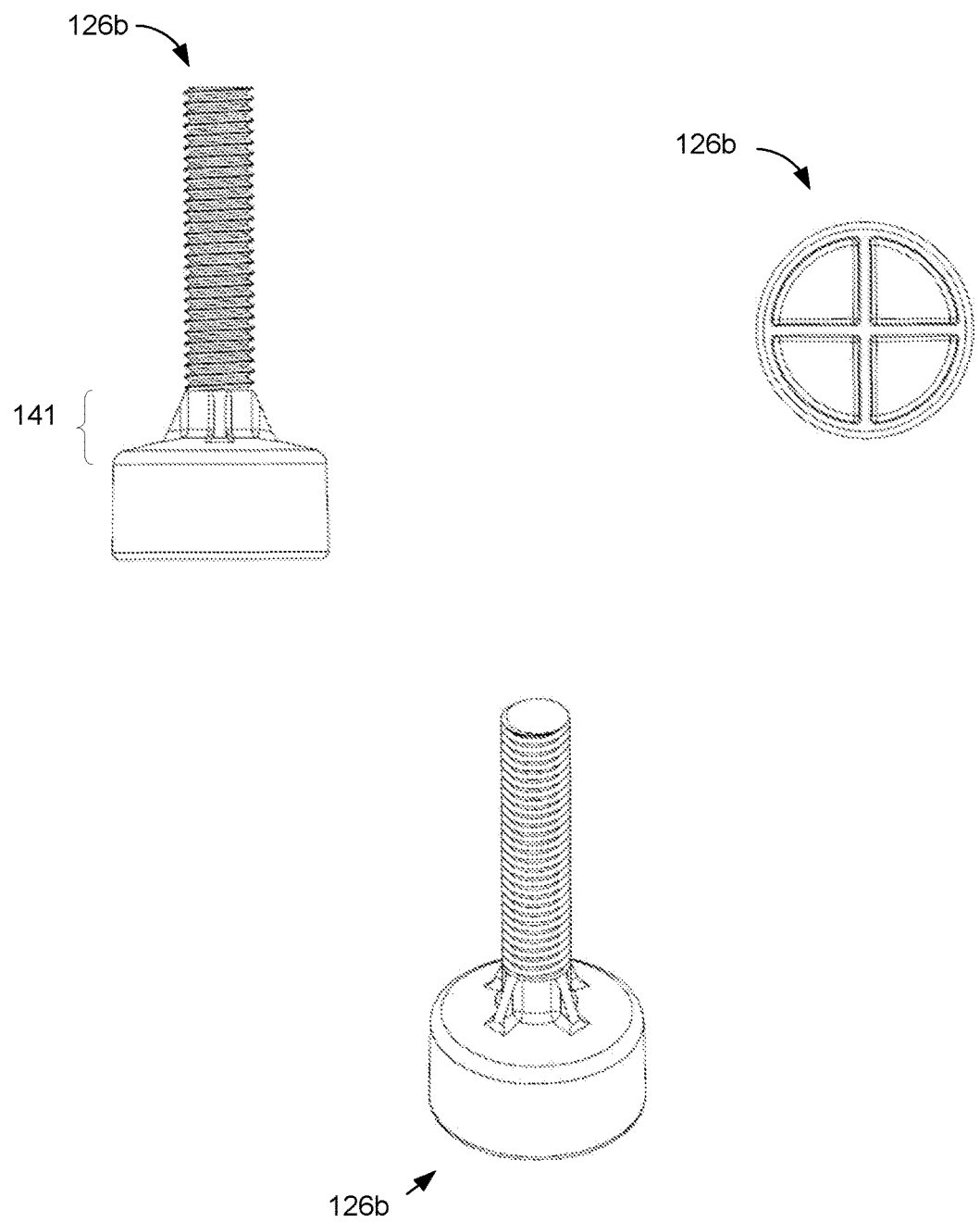
FIG. 6B illustrates a side view, a perspective view, and a bottom view of a second example threaded wedge according to one embodiment described herein.

With reference to FIG. 6B, shown is a side view, a perspective view, and a bottom view of a second example threaded wedge. FIG. 6B illustrates an alternate embodiment, among others, of a threaded wedge 126b where the upper portion 141 of the compression head 138 is configured in a tapered shape.

Figure 6C:
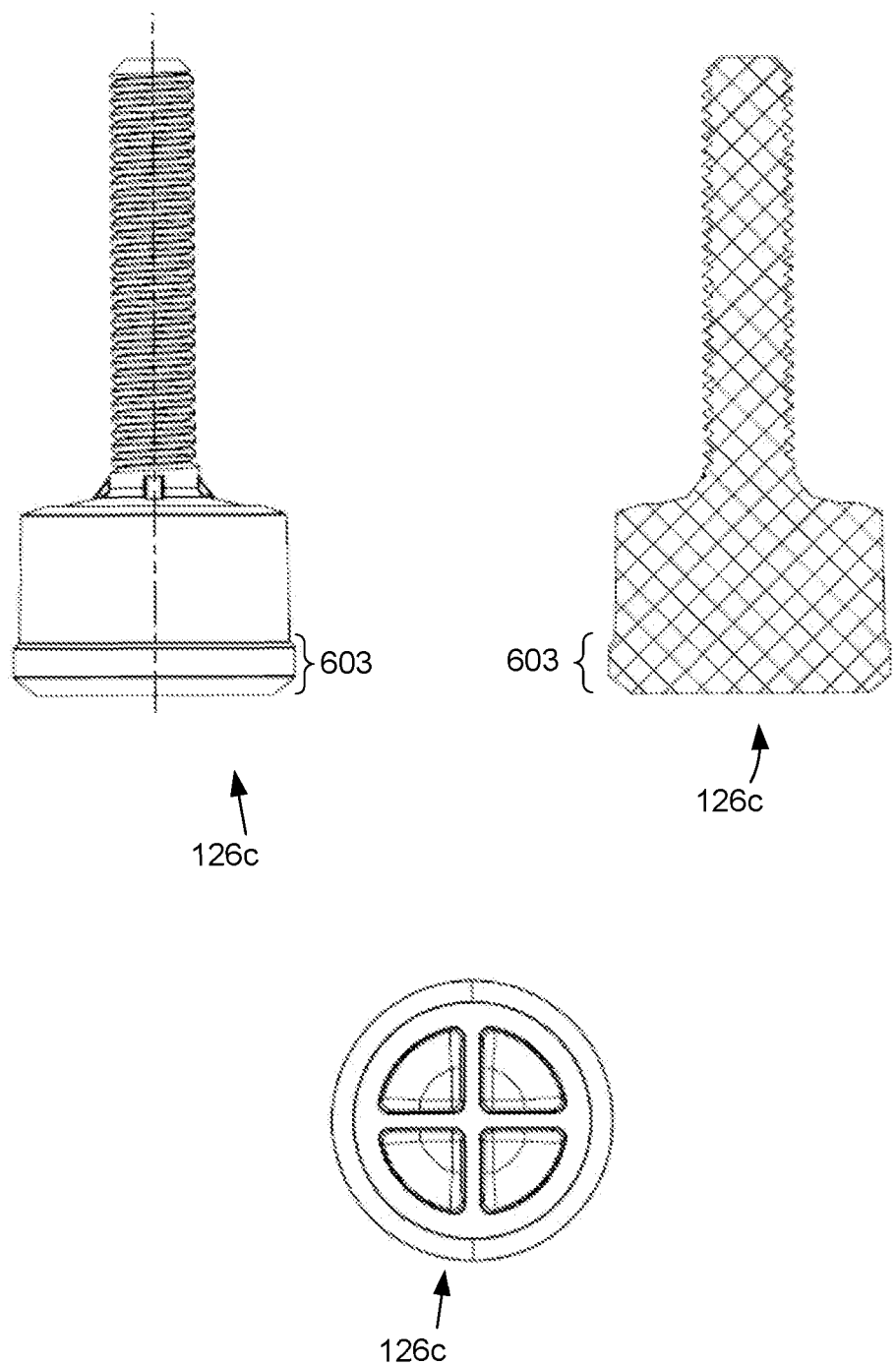
FIG. 6C illustrates a side view, a cross sectional view, and a bottom view of a third example threaded wedge according to one embodiment described herein.

With reference to FIG. 6C, shown is a side view, a cross sectional view, and a bottom view of a third example threaded wedge. FIG. 6C illustrates a cross sectional view "A" of a side view of a threaded wedge 126c. The side view and the cross sectional view "A" illustrate a flare 603 substantially near one end of the compression head 138. In some embodiments, the flare 603 has an OD that is smaller than the ID opening of the smallest pipe the multi-tier compression gasket 102 is designed for in one embodiment. The flare 603 can be situated near the bottom, the top, or other suitable locations on the compression head 138.

Figure 6E:
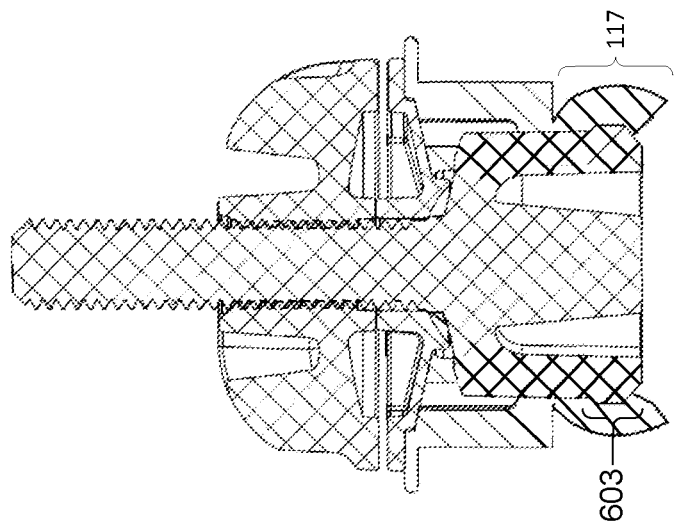
FIG. 6E illustrates cross sectional view of the multi-tier compression gasket plug using the threaded wedge in FIG. 6C for creating a seal with the first plug tier according to one embodiment described herein.
Figure 6D:
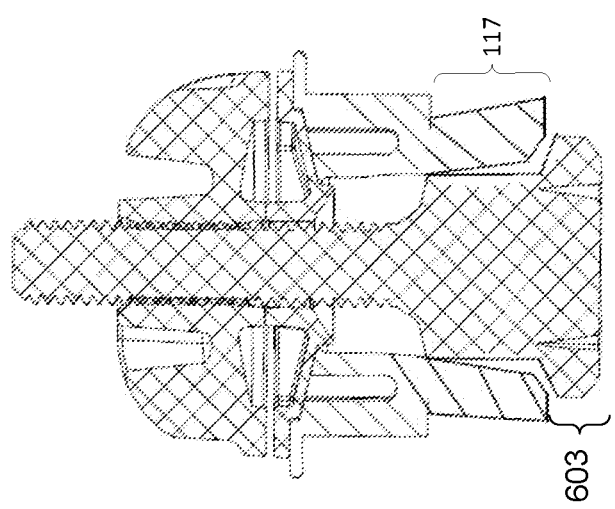
FIG. 6D illustrates a cross sectional view of the multi-tier compression gasket plug using the threaded wedge in FIG. 6C for creating a seal with the second plug tier according to one embodiment described herein.

As shown in FIG. 6D, the flare 603 prevents the threaded wedge 126 from traveling beyond the second plug tier 117 when the desire is to plug a smaller size opening because the compression gasket 111 cannot expand far enough into the smaller opening and limiting the travel.

As illustrated in FIG. 6E, the flare 603 can travel beyond the second plug tier 117 provided the multi-tiered compression gasket plug 102 is positioned in a larger pipe opening because the rubber of the second plug tier 117 of the compression gasket 111 will have room to expand.

Figure 7:
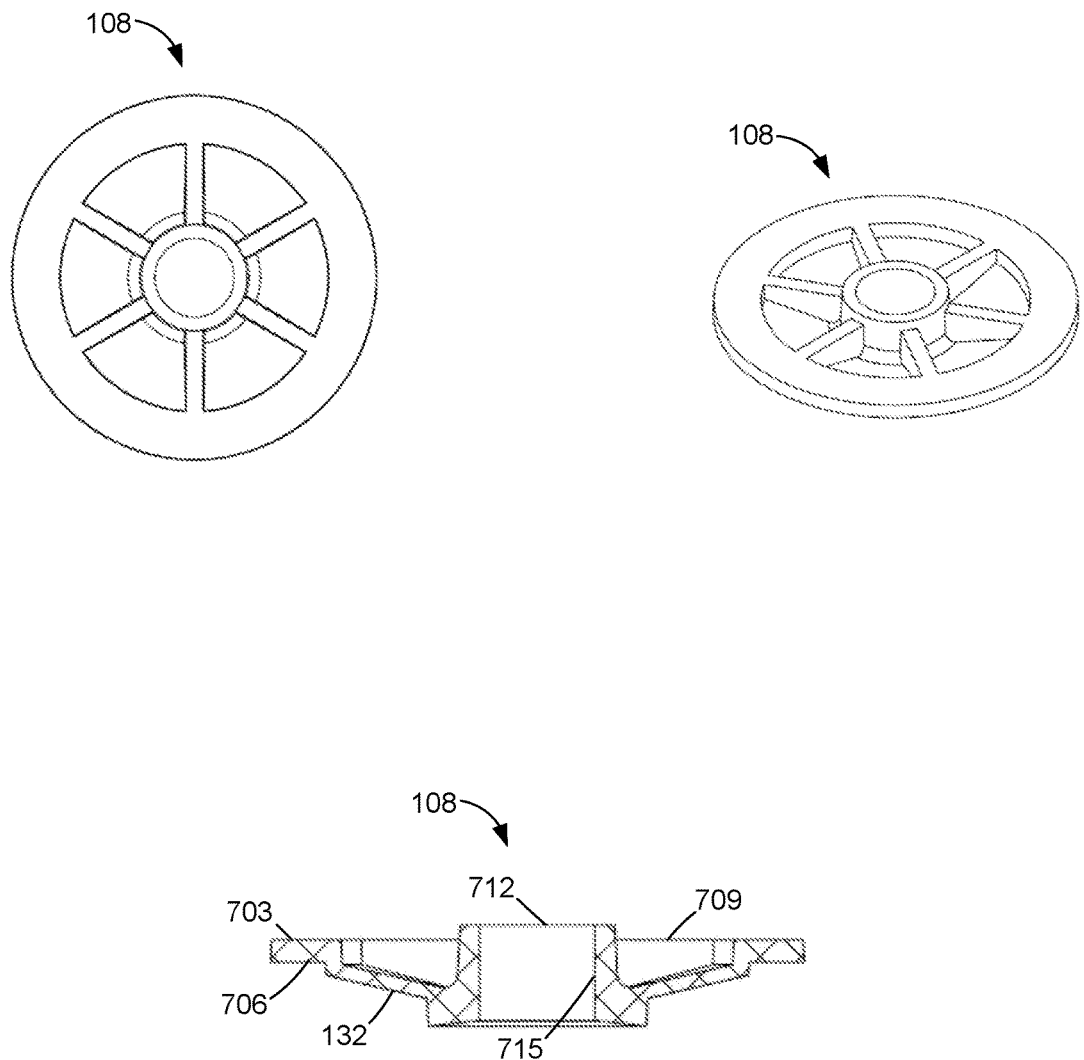
FIG. 7 illustrates a top view, a side view, and a cross sectional view of a washer according to one embodiment described herein.

Moving on to FIG. 7, shown is a top view, a side view, and a cross sectional view of the washer 108 (FIG. 1A). The washer 108 may include an upper side 703 and a lower side 706. The lower side may include an extended step 132. In some embodiments, the upper side 703 may include a washer cavity 709. The washer 108 may also include an opening 712 that allows the threaded wedge 126 to extend though. Although not shown, in some embodiments, the washer 108 can have threads on an inner surface 715 that surrounds the opening 712. The washer 108 can be formed from plastic, metal, or other suitable materials.

Figure 8A:
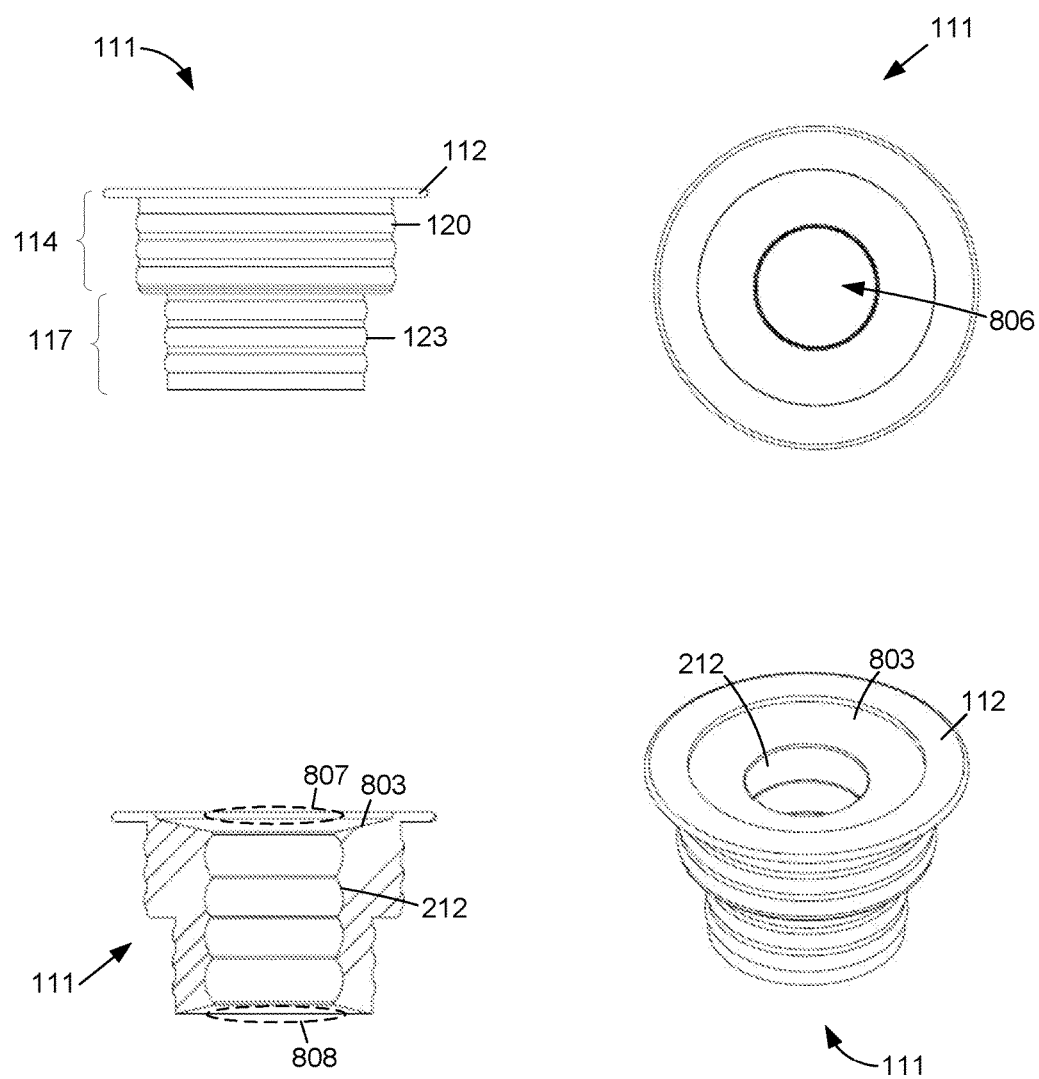
FIG. 8A illustrates a side view, a top view, a cross sectional view, and a perspective view of a first example compression gasket, according to one embodiment described herein.

Referring next to FIG. 8A, shown is a side view, a top view, a cross sectional view, and a perspective view of a first example compression gasket. The compression gasket 111 may include the first plug tier 114 and the second plug tier 117. The first plug tier may include the top plug lip 112 and a recessed step 803. In some embodiments, among others, the compression gasket 111 may not have a recessed step 803. The recessed step 803 can assist in centering the washer 108. In the illustrated embodiment, the recessed step 803 and the inner wall 212 surround the inner cavity 806 in the compression gasket 111. In some embodiments, among others, the inner wall 212 can be comprised of multiple ribbed segments. In addition, the outer surface of the first plug tier 114 has a first tier of outer seal beads 120 and the outer surface of the second plug tier 117 has a second tier of outer seal beads 123. Also, the compression gasket 111 has a top opening 807 and a bottom opening 808. In some embodiments, a diameter associated with the top opening 807 can be smaller than a diameter associated with the bottom opening 808.

Figure 8B:
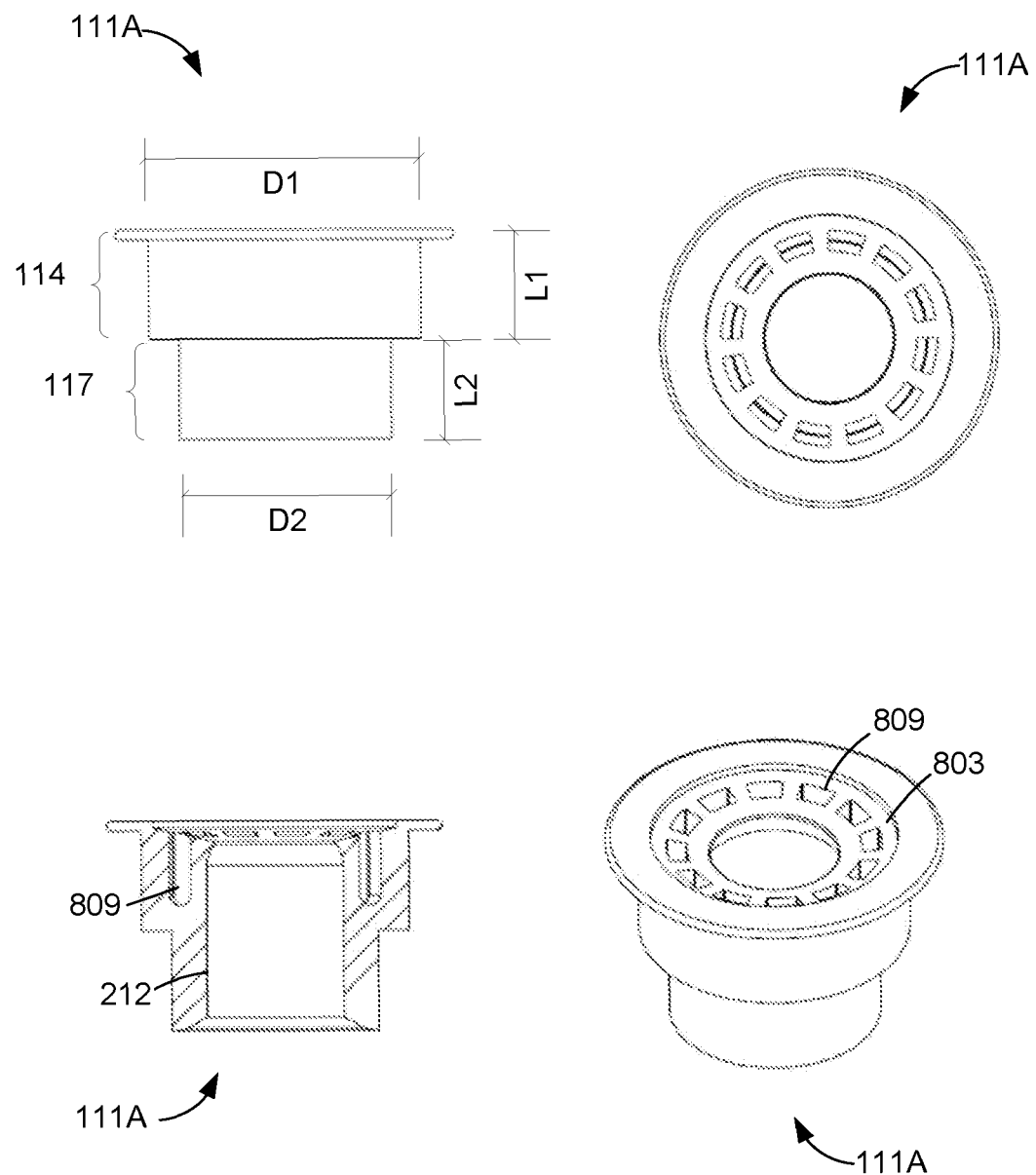
FIG. 8B illustrates a side view, a top view, a cross sectional view, and a perspective view of a second example compression gasket, according to one embodiment described herein.

With reference to FIG. 8B, shown is a side view, a top view, a cross sectional view, and a perspective view of a second example compression gasket. FIG. 8B depicts the first plug tier 114 and the second plug tier 117 of a compression gasket 111A without outer seal beads. In addition, the inner wall 212 does not have multiple ribbed segments. In FIG. 8B, when the threaded gasket cap 105 is tightened, the compression gasket 111A expands to compress against the inner wall of a pipe opening. As such, the compression gasket 111A can create a seal without outer seal beads. FIG. 8B also illustrates the recessed step 803 with holes 809 around the inner cavity 806. In some embodiments, the holes 809 are used for molding and creating even wall thickness in the compression gasket 111A.

In addition, FIG. 8B illustrates the first plug tier 114 having a diameter "D1" and a length "L1". The second plug tier 117 is illustrated having a second diameter "D2" and a second length "L2". The illustrated embodiment shows "D1" as being larger than "D2". As discussed above, the "D1" and "D2" can expand as the threaded gasket cap 105 (FIG. 1A) is tightened. Also, the "D1", "D2", "L1", and "L2" can be different values. In particular, these dimensions, "D1", "D2", etc. can be selected for use with standard sizes of pipes, tees, and other suitable access points for pipes.

Figure 9:
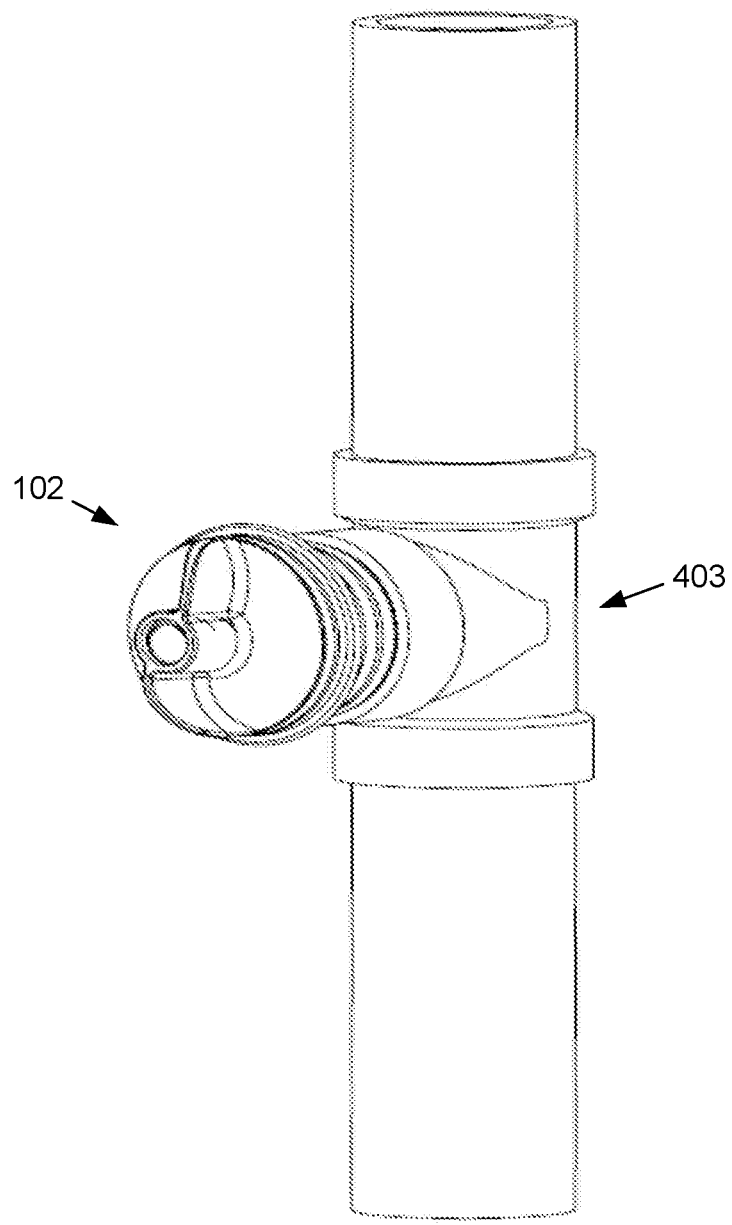
FIG. 9 illustrates a perspective view of the multi-tier compression gasket plug shown in FIGS. 1A and 1B employed in a tee according to one embodiment described herein.

With reference to FIG. 9, shown is a perspective view of the multi-tier compression gasket plug employed in the tee 403.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A device, comprising:
    a multi-tier compression gasket plug having an outer wall and an inner wall that surrounds an inner cavity along an axis of symmetry of the multi-tier compression gasket plug, the multi-tier compression gasket plug comprising a first plug tier having a first outer surface diameter that extends a first length along the axis of symmetry from one end of the multi-tier compression gasket plug, and a second plug tier having a second outer surface diameter that extends a second length along the axis of symmetry from the first plug tier, the inner cavity comprising a top opening and a bottom opening, wherein the multi-tier compression gasket plug comprises a top plug lip that includes a recessed step, wherein the recessed step surrounds the top opening;

a compression shank situated in and extending through the inner cavity of the multi-tier compression gasket plug, the compression shank having a threaded length;

a compression head attached to a distal end of the compression shank and having a larger diameter than the compression shank; and a threaded gasket cap comprising a threaded opening, the threaded length of the compression shank extending in threaded engagement through the threaded opening.

2. The device of claim 1, wherein, over a first range of the threaded engagement, the compression head occupies a space outside the inner cavity.

3. The device of claim 1, wherein, over a range of the threaded engagement, the compression head occupies at least a portion of the inner cavity along the second length of the axis of symmetry.

4. The device of claim 1, wherein, over a range of the threaded engagement, the compression head occupies at least a portion of the inner cavity along the first length of the axis of symmetry.

5. The device of claim 1, wherein the multi-tier compression gasket plug comprises at least one of TPE rubber, SBR rubber, EPDM, NBR, Silicone or flexible PVC.

6. The device of claim 1, wherein the compression head comprises a first section attached to a second section, the first section having a smaller diameter than the second section, and the first section being connected to the compression shank.

7. The device of claim 6, wherein the first section has at least one of a curved side surface, an inclined side surface, or a multi-tier side surface.

8. The device of claim 1, wherein the first plug tier comprises a ribbed outer surface.

9. The device of claim 1, wherein a first diameter of the top opening of the inner cavity substantially corresponds with a second diameter of the bottom opening of the inner cavity, wherein the top opening is associated with the first plug tier and the bottom opening is associated with the second plug tier.

10. The device of claim 1, further comprises a washer that includes an opening, the compression shank extending through the opening.

11. An apparatus, comprising:
a multi-tier compression gasket plug having an outer wall and an inner wall that surrounds an inner cavity, the multi-tier compression gasket plug comprising a first plug tier having a first outer surface diameter and a second plug tier having a second outer surface diameter, the inner cavity comprising a top opening and a bottom opening, wherein the multi-tier compression gasket plug comprises a top plug lip that includes a recessed step, wherein the recessed step surrounds the top opening;

a compression shank extending through the inner cavity of the multi-tier compression gasket plug, the compression shank having a threaded length;

a compression head attached to the compression shank; and a gasket cap comprising a threaded opening, the threaded length of the compression shank extending in threaded engagement through the threaded opening.

12. The apparatus of claim 11, wherein the inner wall comprises a tapered shape along an axis of symmetry of the multi-tier compression gasket plug.

13. The apparatus of claim 11, wherein the inner wall comprises a plurality of ribbed segments.

14. The apparatus of claim 11, wherein the first plug tier and the second plug tier comprise a plurality of seal beads on an outer surface.

15. The apparatus of claim 11, wherein the compression head comprises a tapered portion having at least one of a rounded outer surface, an inclined side surface, or a multi-tier surface.

16. The apparatus of claim 11, further comprising a washer comprising an upper side and a lower side, the lower side comprising an extended step, the washer being situated in the recessed step and above the top opening of the multi-tier compression gasket plug.

17. The apparatus of claim 11, wherein the gasket cap comprises a grip, the grip comprising a raised projection having a curved-shape.

18. An apparatus, comprising:
a multi-tier compression gasket plug having an outer wall and an inner wall that surrounds an inner cavity, the multi-tier compression gasket plug comprising a first plug tier having a first outer surface diameter and a second plug tier having a second outer surface diameter, wherein the multi-tier compression gasket plug comprises a top plug lip that includes a recessed step, wherein the recessed step surrounds a top opening of the inner cavity;

a threaded wedge extending through the inner cavity of the multi-tier compression gasket plug, the threaded wedge having a threaded length;

a washer comprising an opening, the threaded wedge extending through the opening; and a gasket cap comprising a threaded opening, the threaded length of the threaded wedge extending in threaded engagement through the threaded opening.

19. The apparatus of claim 18, wherein the gasket cap comprises a grip that comprises a raised projection.

20. The apparatus of claim 18, wherein the threaded wedge comprises a compression head attached to one end.

21. The apparatus of claim 20, wherein the compression head is formed having a wedged shape.

22. The apparatus of claim 20, wherein the compression head comprises a flared rim that at least substantially encircles one end of the compression head.

23. The apparatus of claim 22, wherein the flared rim is formed having a diameter smaller than an inside diameter of a smallest pipe designed for the apparatus.

24. The apparatus of claim 18, wherein the threaded wedge is straight.

25. The apparatus of claim 24, wherein the threaded wedge is straight formed having a diameter smaller than an inside diameter of a smallest pipe designed for the apparatus.

* * * * *